United States Patent
Chen et al.

(10) Patent No.: US 8,315,492 B2
(45) Date of Patent: Nov. 20, 2012

(54) FIBER CONNECTOR MODULE INCLUDING INTEGRATED OPTICAL LENS TURN BLOCK AND METHOD FOR COUPLING OPTICAL SIGNALS BETWEEN A TRANSCEIVER MODULE AND AN OPTICAL FIBER

(75) Inventors: Ye Chen, San Jose, CA (US); Bing Shao, San Jose, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 387 days.

(21) Appl. No.: 12/429,261

(22) Filed: Apr. 24, 2009

(65) Prior Publication Data

US 2010/0272403 A1 Oct. 28, 2010

(51) Int. Cl.
*G02B 6/32* (2006.01)
*G02B 6/36* (2006.01)

(52) U.S. Cl. ............................ 385/33; 385/93
(58) Field of Classification Search ............... 385/93, 385/33

See application file for complete search history.

(56) References Cited

U.S. PATENT DOCUMENTS

| | | | |
|---|---|---|---|
| 6,203,212 B1 | 3/2001 | Rosenberg et al. | |
| 6,307,197 B1 | 10/2001 | Krug et al. | |
| 6,409,397 B1 | 6/2002 | Weigert | |
| 6,454,470 B1 | 9/2002 | Dwarkin et al. | |
| 6,724,958 B1 | 4/2004 | German et al. | |
| 6,913,400 B2 | 7/2005 | O'Toole et al. | |
| 6,959,133 B2 * | 10/2005 | Vancoill et al. | 385/47 |
| 7,066,657 B2 | 6/2006 | Murali et al. | |
| 7,198,416 B2 | 4/2007 | Ray et al. | |
| 2002/0064191 A1 | 5/2002 | Capewell et al. | |
| 2002/0067886 A1 | 6/2002 | Schaub | |
| 2002/0071639 A1 | 6/2002 | Kropp | |
| 2002/0131727 A1 | 9/2002 | Reedy et al. | |
| 2003/0215240 A1 | 11/2003 | Grann et al. | |
| 2005/0185900 A1 * | 8/2005 | Farr | 385/93 |
| 2006/0072883 A1 | 4/2006 | Kilian et al. | |
| 2006/0159404 A1 * | 7/2006 | Vancoille | 385/88 |
| 2007/0140628 A1 * | 6/2007 | Ebbutt et al. | 385/89 |
| 2008/0095506 A1 | 4/2008 | McColloch | |
| 2008/0232737 A1 | 9/2008 | Ishigami et al. | |
| 2009/0129725 A1 * | 5/2009 | Durrant et al. | 385/14 |

FOREIGN PATENT DOCUMENTS

| | | |
|---|---|---|
| CN | 1804674 | 7/2006 |
| WO | WO-96/10200 | 4/1996 |

* cited by examiner

*Primary Examiner* — Omar Rojas (57) ABSTRACT

Embodiments of the invention include a fiber connector module and method for coupling optical signals between an optical transceiver module and an optical fiber described herein involve the coupling to or overmolding of a fiber connector module to an optical transceiver module or other optical source, and a fiber lens coupled to for formed into an angled surface of the fiber connector module housing. The angled surface and the fiber lens are configured in such a way that the fiber lens focuses collimated light from the transceiver module to the receiving end of an optical fiber or other optical detector positioned within the fiber connector module housing. Fiber connector modules according to embodiments of the invention allow for relatively low profiles compared to conventional arrangements and configurations, especially with multi-channel, parallel lane configurations.

18 Claims, 9 Drawing Sheets

FIG. 13

FIBER CONNECTOR MODULE INCLUDING INTEGRATED OPTICAL LENS TURN BLOCK AND METHOD FOR COUPLING OPTICAL SIGNALS BETWEEN A TRANSCEIVER MODULE AND AN OPTICAL FIBER

BACKGROUND OF THE INVENTION

1. Field of the Invention

The invention relates to optical communications using optical transceiver modules. More particularly, the invention relates to fiber connector modules used for coupling optical signals between optical transceiver modules and optical fibers.

2. Description of the Related Art

In optical communications networks, optical transceiver modules are used to transmit and receive optical signals over optical fibers. Such a transceiver module generates amplitude and/or phase and/or polarization modulated optical signals, that represent data, which are then transmitted over an optical fiber coupled to the transceiver module. The transceiver module includes a transmitter side and a receiver side. On the transmitter side, a laser light source generates laser light and an optical coupling system receives the laser light and optically couples, or images, the light onto an end of an optical fiber. The laser light source typically comprises one or more laser diodes that generate light of a particular wavelength or wavelength range. The optical coupling system typically includes one or more reflective elements, one or more refractive elements and/or one or more diffractive elements.

In conventional arrangements, the optical transceiver includes one or more light sources, such as one or more vertical-cavity, surface-emitting lasers (VCSELs), and corresponding coupling optics, such as one or more coupling lenses. The coupling optics are arranged with respect to the light source and configured to focus light generated by the light source to the receiving end of an optical fiber. Alternatively, depending on the coupling configuration of the optical fiber to the transceiver, additional coupling optics, either within the optical transceiver or within an additional fiber connector module coupled to the optical transceiver, can be used to redirect, turn or fold the focused light to the receiving end of the optical fiber. The receiving end of the optical fiber typically is fixably positioned within a fiber connector or other suitable device that couples the receiving end of the optical fiber to the optical transceiver. Often, the receiving end of the optical fiber is positioned at the coupling interface between the transceiver and the fiber connector, thus the coupling optics within the transceiver often are configured so that the focal point of the coupling optics lies within or is relatively close to the plane of such coupling interface.

However, because the apertures of the light source and the receiving end of the optical fiber are relatively small, the light source and the optical fiber must be aligned with respect to one another within relatively stringent lateral or radial alignment tolerances. Also, the focal length of the coupling optics between the light source and the receiving end of the optical fiber imposes additional restrictions on axial (z-direction) alignment tolerances between at least a portion of the coupling optics and the receiving end of the optical fiber, i.e., the distance between the coupling optics and the receiving end of the optical fiber along the path of the light generated by the light source.

Some conventional transceiver modules are configured to output a collimated beam or light rather than a focused beam of light. Typically, such transceiver configuration somewhat eases the lateral and z-direction alignment tolerances between the transceiver module and a connector module coupled to the transceiver module.

However, a need still exists for a fiber connector module to be used with an optical transceiver and one or more optical fibers, and a method of coupling optical signals between an optical transceiver and one or more optical fibers, that relaxes lateral (radial) and axial alignment tolerances between the optical transceiver and the optical fiber connector, allows one or more optical fibers to be more accurately positioned with respect to the focal point of the focused light, and provides a lower profile than many conventional fiber connector modules.

SUMMARY OF THE INVENTION

The fiber connector module and method for coupling optical signals between an optical transceiver module and an optical fiber described herein involve the coupling or overmolding of a fiber connector module to an optical transceiver module or other optical source, and a fiber lens coupled to an angled surface of the fiber connector module housing. The angled surface and the fiber lens are configured in such a way that the fiber lens focuses collimated light from the transceiver module to the receiving end of an optical fiber or other optical detector positioned within the fiber connector module housing. Fiber connector modules according to embodiments of the invention allow for relatively low profiles compared to conventional arrangements and configurations, especially with multi-channel, parallel lane configurations.

DETAILED DESCRIPTION

In the following description, like reference numerals indicate like components to enhance the understanding of the differential receiver testing methods and arrangements through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Figure 1:
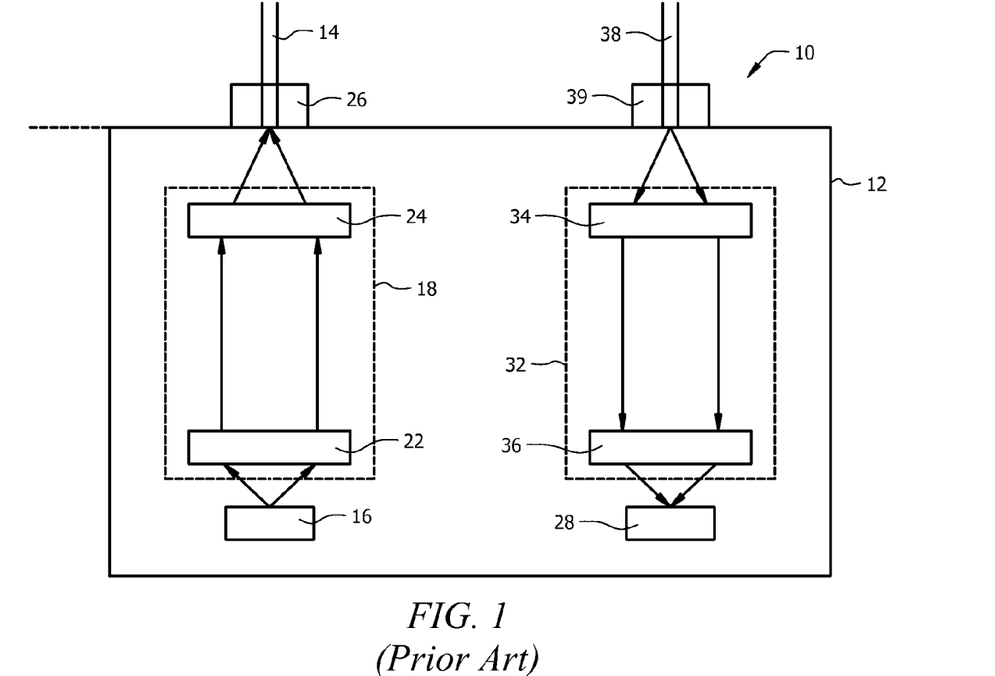
FIG. 1 illustrates a schematic view of a conventional optical coupling arrangement between an optical transceiver module and an optical fiber.

Referring now to FIG. 1, shown is a schematic view of a conventional optical coupling arrangement 10 between an optical transceiver 12 and an optical fiber 14. The optical transceiver 12 can be made of a molded plastic material or other suitable material. The optical fiber 14 can be any optical fiber suitable for receiving optical signals, such as a single mode optical fiber or a multimode optical fiber.

The optical transceiver 12 can have a transmitter portion that includes a light source 16 and a coupling optics arrangement 18. The light source 16 can be any suitable light source for generating optical signals, such as a VCSEL or other suitable light source. The coupling optics arrangement 18 includes a collimating lens 22 and a fiber lens 24. Alternatively, the collimating lens 22 and the fiber lens 24 can be a single lens unit having a first, collimating surface and a second, opposing fiber lens surface.

The coupling optics arrangement 18 receives light from the light source 16 and focuses it onto the receiving end of the optical fiber 14. The receiving end of the optical fiber 14 typically is fixably positioned within a fiber connector or connecting device 26, which couples the receiving end of the optical fiber to the optical transceiver. To achieve sufficient coupling efficiency between the light source 16 and the optical fiber 14, the receiving end of the optical fiber 14 must be properly aligned with the light source 16 in the lateral or radial direction. Therefore, in such conventional arrangements, the optical axis of the light source 16 must be aligned with the optical axis of the collimating lens 22, and the optical axis of the fiber lens 24 must be aligned with the optical axis of the optical fiber 14. Also, for proper coupling efficiency, the receiving end of the optical fiber 14 must be properly aligned with the light source 16 axially, i.e., in the z direction. For such alignment, the light source 16 must lie in the focal plane of the collimating lens 22 and the receiving end of the optical fiber 14 must lie in the focal plane of the fiber lens 24. In this manner, the light from the light source 16 will be focused by the coupling optics arrangement 18 to a focal point that coincides with the receiving end of the optical fiber 14.

The optical transceiver 12 also can include a receiver portion that receives optical signals from an optical fiber 38 coupled to the transceiver 12 via a fiber connector 39 or other suitable fiber coupling means. The optical fiber 38 can be any optical fiber suitable for transmitting optical signals, such as a single mode optical fiber or a multimode optical fiber. The receiver portion of the optical transceiver 12 typically includes a light detector or receiver 28 and a corresponding coupling optics arrangement 32. The light detector 28 can be any suitable light detector, such as one or more receiver photodiodes or other suitable light detecting components. The corresponding receiver coupling optics arrangement 32 can include one or more lenses, such as lenses 34 and 36, that focus light output from the end of the receive optical fiber 38 onto the respective light detector 28.

Figure 2:
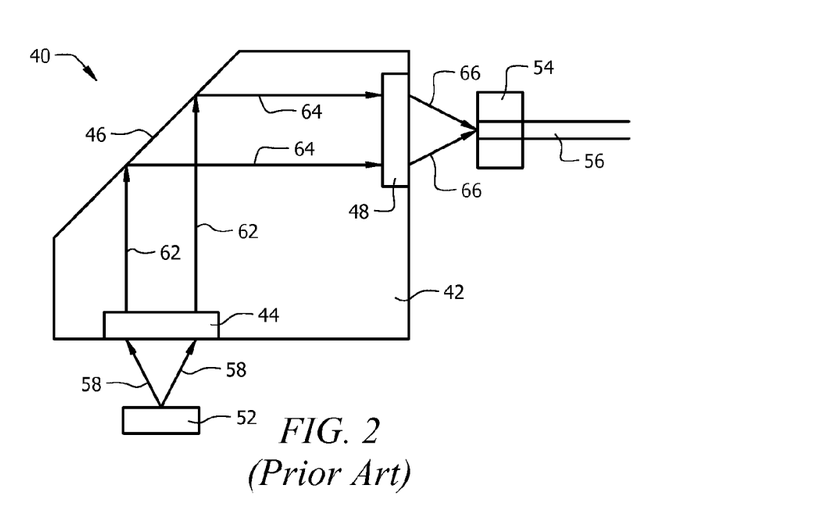
FIG. 2 illustrates a schematic view of a conventional optical turn device fiber connector module for coupling optical signals between an optical transceiver module and an optical fiber.

Referring now to FIG. 2, shown is a schematic view of a conventional fiber coupling or connector module 40, e.g., an optical turn device, for coupling optical signals between an optical transceiver and an optical fiber. The ray tracings of the light paths between the optical transceiver and the optical fiber are shown in the figure. In addition to coupling the receiving end of an optical fiber directly to a coupling surface of the optical transceiver, optical fibers can be coupled to an optical transceiver through the use of a fiber connector module, such as the optical turn device 40. A fiber connector module can be used to redirect optical signals between the optical transceiver and the optical fiber when different transceiver-to-fiber orientations are desired. Some conventional fiber connector modules are referred to as optical turn devices, and are configured to turn or redirect optical signals between the light source in the optical transceiver and a receiving optical fiber.

The conventional optical turn device 40 includes a housing 42 that includes an input collimating lens 44, a totally internal reflecting (TIR) plano surface 46 and an output fiber lens 48. The housing 42 typically is made of plastic, such as injection molded plastic, or other suitable material. The TIR surface 46 is a turn mirror configuration, which can be formed by plating a tilted surface with metal or other suitable material that causes total internal reflection of an optical signal directed thereon. As discussed, the optical turn device 40 is configured to redirect or turn optical signals, e.g., approximately 45 degrees, between a light source 52, such as a VCSEL, and an optical receiver 54, such as a photodiode or the receiving end of an optical fiber 56.

For proper operation of the optical turn device 40, the light source 52 should be suitably positioned with respect to the input lens 44, i.e., the light source 52 should be positioned in such a way that the optical axis of the light source 52 is aligned with the optical axis of the input lens 44 and the light source 52 lies in the focal plane of the input lens 44. Similarly, the optical detector 54 should be suitably positioned with respect to the output lens 48, i.e., the optical detector 54 should be positioned in such a way that the optical axis of the optical detector 54 is aligned with the optical axis of the output lens 48 and the optical detector 54 lies in the focal plane of the output lens 48. As discussed hereinabove, positioning or otherwise coupling the optical detector 54 or the optical fiber 56 in this manner must be done within relatively tight tolerances, or coupling efficiency will be affected.

In operation, optical signals in the form of light rays 58 from the light source 52 enter the input lens 44. The input lens 44 collimates the incoming light rays 58 into collimated light rays 62. The collimated light rays 62 then reflect off of the TIR plano surface 46, e.g., at a right angle, as reflected light rays 64. The reflected light rays 64 are directed toward and pass through the output lens 48, where they are focused onto the optical detector 54.

Compared to directly coupling the receiving end of an optical fiber to a coupling surface of the optical transceiver, the use of a fiber connector module creates or yields a larger axial and lateral maneuvering space between the optical transceiver and the optical fiber. This is especially true for transceiver/fiber coupling arrangements with relatively high density parallel channel configurations.

As discussed hereinabove, because of the relatively small apertures of the light source and the receiving end of the optical fiber, the lateral (radial) and axial (z-direction) alignment between the light source and the input lens must be within relatively strict or tight alignment tolerances to achieve suitable coupling efficiency therebetween. Similarly, the lateral (radial) and axial (z-direction) alignment between the fiber lens and the receiving end of the optical fiber must be within relatively strict or tight alignment tolerances for suitable coupling efficiency therebetween. Otherwise, even relatively small movements of one or more parts within the arrangement can result in a variation in the optical path that will prevent the focal point of the light beam from coinciding with the receiving end of the fiber, which will result in optical losses. Therefore, such arrangements place unusually strict tolerances on selecting materials and manufacturing the module and other components involved in the optical coupling arrangement.

Figure 3:
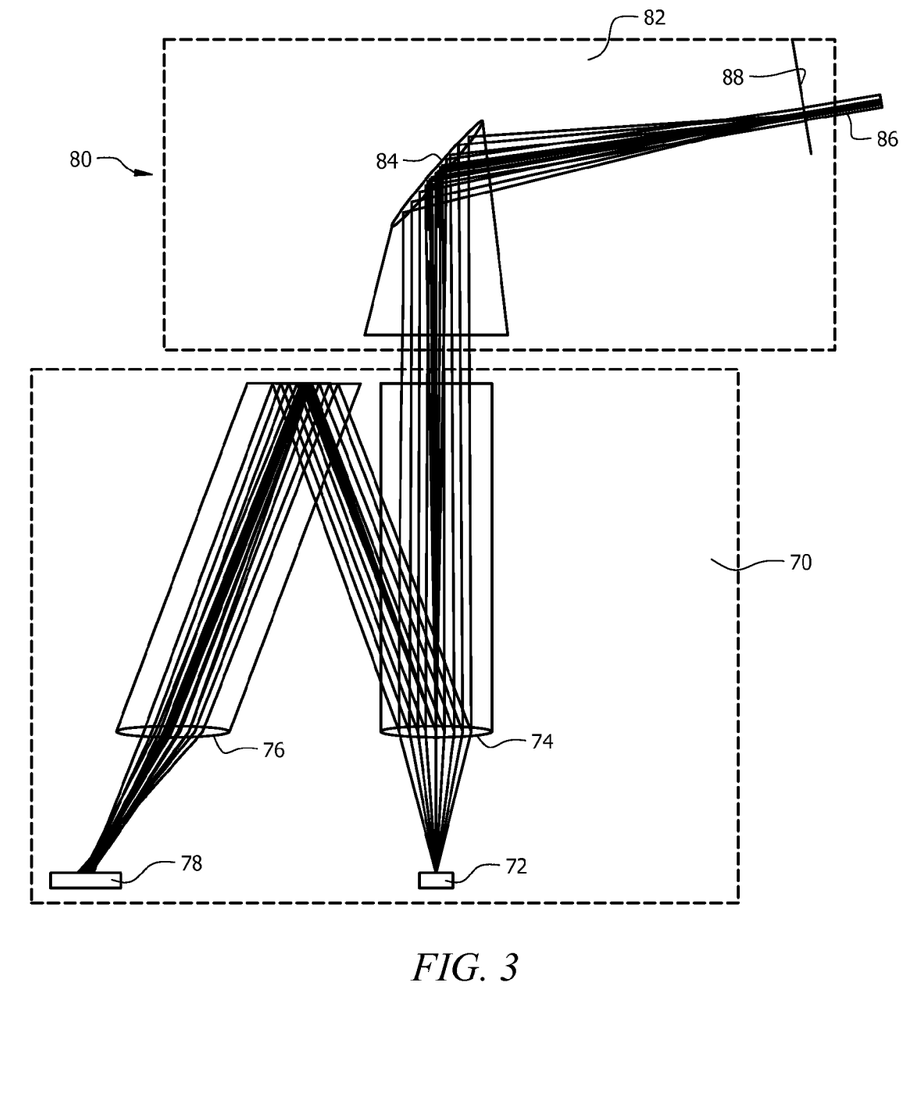
FIG. 3 illustrates a schematic view of a fiber connector module for use in coupling optical signals between the transmitter portion of an optical transceiver module and an optical fiber according to embodiments of the invention.

Referring now to FIG. 3, shown is a schematic view of a fiber connector module 80 for use in coupling optical signals between the transmitter portion of an optical transceiver and an optical fiber according to embodiments of the invention. The fiber connector module 80 is shown generally coupled to an optical transceiver module 70.

It should be understood that the term transceiver, optical transceiver, transceiver module or optical transceiver module can be used to refer to a module device that has an optical transmission portion or an optical receive portion, or both an optical transmission portion and an optical receive portion. However, in FIG. 3, only the transmission portion of the transceiver module 70 is shown and described. Also, as will be discussed in greater detail hereinbelow, the fiber connector module 80 is configured in such a way that the fiber connector module 80 can be used with either system transmitter optics or system receiver optics, thus reducing overall system component costs and reducing system component interconnectability.

As discussed hereinabove, some transceiver modules are configured to output collimated light, rather than focused light, which can ease alignment tolerances between the fiber connector module 80 and the transceiver module 70. In such transceiver modules, one or more collimating lenses are positioned with respect to the focal point of their respective light source to generate collimated light, which is output from the transceiver module 70. Such use of one or more collimating lenses to transmit collimated light from the optical transceiver allows fiber connector modules, including the fiber connector module 80 according to embodiments of the invention, to have relatively relaxed lateral (radial) and axial (z-direction) alignment tolerances when coupled to the transceiver module 70.

As shown, the transceiver module 70 includes a light source 72, such as a VCSEL, and a collimating lens 74. The collimating lens 74 can be a single lens or multiple lenses that form a lens system that collimates the light received from the light source 72. Light from the light source 72 is received by the collimating lens 74 and output from the transceiver module 70 in the form of collimated light. The transceiver module 70 also can include a monitor lens 76, which can divert a portion of the collimated light to a monitor 78, such as a photodiode.

Because the light output from such a transceiver module is collimated light rather than focused light, a fiber connector to be used with such transceiver module can be configured in a more efficient, less complex manner compared to conventional fiber connector modules, including optical turn devices, such as the conventional optical turn device 40 shown in FIG. 2. For example, because a collimating lens is included within such transceiver modules, the fiber connector module does not need an input or collimating lens, unlike conventional fiber connector module arrangements that include such a lens. However, even when used with transceiver modules that output collimated light rather than focused light, conventional fiber connector modules still are subject to relatively strict lateral (radial) and axial (z-direction) alignment tolerances between the fiber connector and the receiving end of the optical fiber to maintain sufficient optical coupling efficiency therebetween.

According to embodiments of the invention, the fiber connector module 80 includes a housing 82 and a fiber lens 84 positioned within the housing 82. The housing 82 is configured to receive and hold the end of one or more optical fibers 86 in such a way that the fiber end coincides or lies substantially in the focal plane of the fiber lens 84. For example, the housing 82 is formed to include one or more v-grooves or other suitable formations 88 therein that allows at least a portion of one or more optical fibers 86 to be positioned within the housing 82 in such a way that the ends of the optical fibers 86 coincide with the focal plane of the fiber lens 84. The ends of the optical fibers 86 can be attached within the v-grooves or other suitable formations 88 using epoxy or in some other suitable manner.

The fiber lens 84 can be any suitable fiber lens that focuses collimated light received by the fiber connector module 80 from the transceiver module 70 to a point on the focal plane of the fiber lens 84. For example, the fiber lens 84 can be a biconic lens, an irregular lens or other suitable fiber lens. Also, although the fiber lens 84 is shown redirecting the focused light to a focal plane coinciding with the end of the optical fiber 86, such is not necessary. That is, the fiber lens 84 can be configured and positioned within the fiber connector module 80 in such a manner that collimated light collimated light received by the fiber connector module 80 is focused to a point on the focal plane of the fiber lens 84 without being redirected. Alternatively, the fiber lens 84 can be configured and positioned within the fiber connector module 80 in such a way that the fiber lens 84 can redirect focused light in any suitable direction toward the end of the optical fiber positioned within the housing 82. For example, depending on refractive index of the material of which the fiber lens 84 is made and the specific orientation of the fiber lens within the fiber connector module 80, the fiber lens 84 can redirect focused light at a redirection angle of between approximately 0-180 degrees to the corresponding fiber end. Typically, the fiber lens is manufactured and configured to redirect focused light at a redirection angle of approximately 90 degrees to the corresponding fiber end. However, the fiber connector module 80 can have a tilted fiber coupling arrangement, as shown in FIG. 3. For example, such arrangement may be used if the fiber lens 84 is made of a material or materials with an overall lower refractive index such that the fiber lens 84 redirects focused light at a redirection angle of between approximately 90-180 degrees, as shown.

The housing 82 can be made by an injection molding process or other suitable process that allows the fiber lens 84 to be positioned at a specific location within the housing 82 within relatively strict tolerances. The housing 82 can be made of a thermally insensitive plastic or other suitable material that allows for one or more fiber lenses to be positioned therein, as well as one or more corresponding optical fibers to be inserted and attached within the v-grooves or other suitable formation 88 formed in the housing 82.

The injection molding or other suitable manufacturing process for the housing 82 also allows the v-grooves or other fiber positioning formations 88 to be formed in the housing 82 with respect to the specific location of the fiber lens within relatively strict tolerances. Therefore, in this manner, alignment between optical fibers 86 positioned within the v-grooves or other fiber positioning formations 88 will be aligned with the fiber lens 84 within relatively strict alignment tolerances, thus promoting suitable coupling efficiency therebetween and for the overall coupling efficiency between the light source 72 and the optical fiber 86. The configuration of the fiber connector 80 is compared to conventional fiber connectors, which align the end of an optical fiber with the fiber lens external to the fiber connector, e.g., as shown in FIG. 2, and discussed hereinabove.

The ability to relax the alignment tolerances between the fiber connector 80 and an optical transceiver module that outputs collimated light, such as the transceiver module 70, contributes to allowing the manufacture of relatively low cost fiber connector modules suitable for use with one or more light sources within the optical transceiver. Also, such relaxed alignment tolerances can contribute to arrangements in which the transceiver module includes a plurality of light sources, and the fiber connector module 80 includes a corresponding plurality of fiber lenses and v-grooves or other suitable formations therein for a corresponding plurality of optical fibers to be positioned therein, e.g., as discussed hereinabove.

Figure 4:
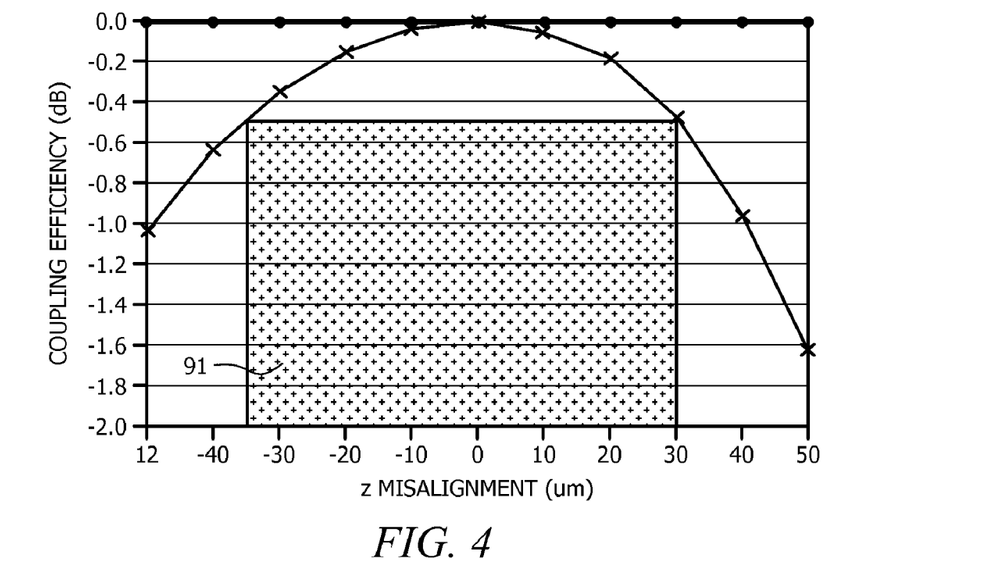
FIG. 4 illustrates a graphical view of optical coupling efficiency as a function of axial (z direction) misalignment between the light source and the collimating lens within an optical transceiver module suitable for use with a fiber connector module according to embodiments of the invention.

Referring now to FIG. 4, illustrated is a graphical view of optical coupling efficiency as a function of axial (z direction) misalignment between the light source 72 and the collimating lens 74 within the optical transceiver module 70. Assuming an acceptable level of coupling loss of no more than −0.5 decibels (dB), the graph shows an area 91 of acceptable axial (z direction) misalignment between the light source 72 and the collimating lens 74. As can be seen, acceptable coupling efficiency is maintained up to approximately 30 microns of misalignment in either direction. That is, the z-direction distance between the light source 72 and the collimating lens 74 can be either increased approximately 30 microns or decreased approximately 30 microns and the coupling efficiency will not be adversely affected beyond the acceptable level of −0.5 dB.

Figure 5:
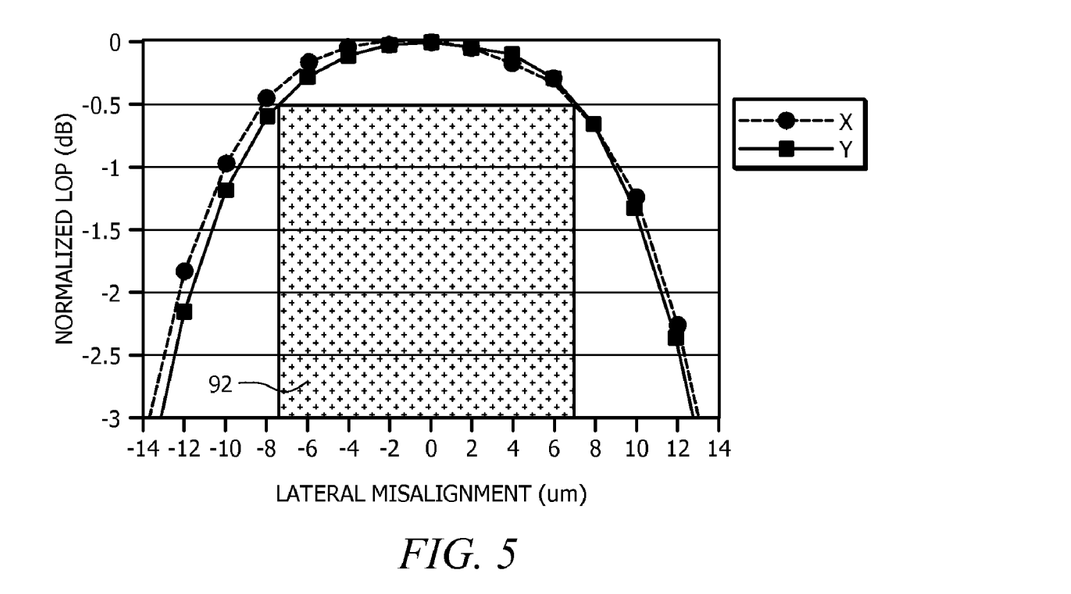
FIG. 5 illustrates a graphical view of normalized loss of power (LOP) as a function of the lateral or radial misalignment between the light source and the collimating lens within an optical transceiver module suitable for use with a fiber connector module according to embodiments of the invention.

Referring now to FIG. 5, illustrated is a graphical view of normalized loss of power (LOP) as a function of the lateral or radial misalignment between the light source 72 and the collimating lens 74 within the optical transceiver module 70. Assuming an acceptable level of normalized LOP of no more than −0.5 dB, the graph shows an area 92 of acceptable lateral or radial misalignment between the light source 72 and the collimating lens 74. As shown, the light source 72 and the collimating lens 74 can be misaligned with respect to one another by approximately 7 microns in either of the x-plane and y-plane directions. That is, as long as any misalignment between the light source 72 and the collimating lens 74 is kept below approximately 7 microns in any lateral (radial) direction, the normalized LOP will remain below an acceptable level of no more than −0.5 dB.

Figure 6:
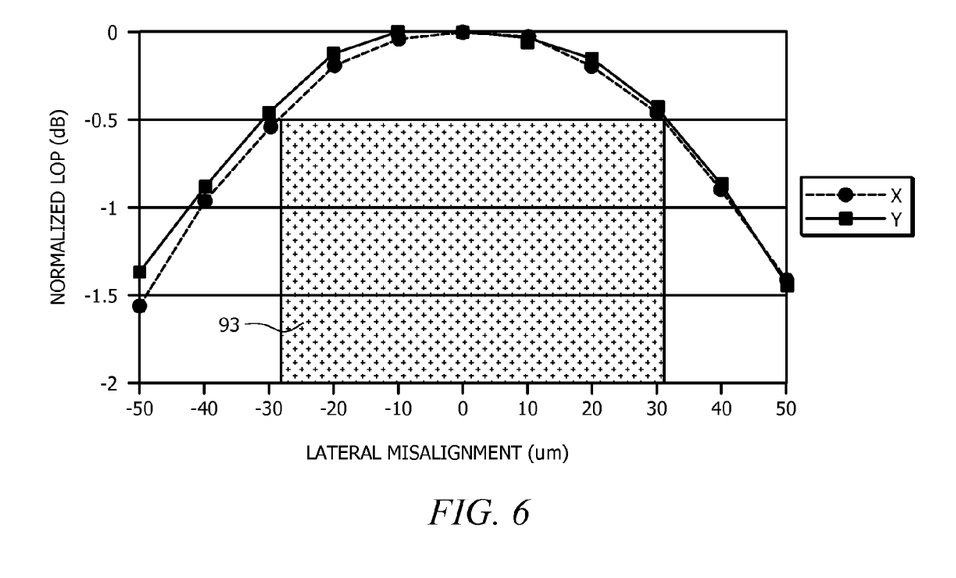
FIG. 6 illustrates a graphical view of normalized loss of power (LOP) as a function of the lateral or radial misalignment between an optical transceiver module and a fiber connector module according to embodiments of the invention used in coupling optical signals between the optical transceiver module and an optical fiber according to embodiments of the invention.

Referring now to FIG. 6, illustrated is a graphical view of normalized loss of power (LOP) as a function of the lateral (radial) misalignment between the optical transceiver module 70 and the fiber connector module 80. Assuming an acceptable level of normalized LOP of no more than −0.5 dB, the graph shows an area 93 of acceptable lateral or radial misalignment between the optical transceiver module 70 and the fiber connector module 80, in both the x-plane and y-plane directions. As shown, lateral misalignment between the optical transceiver module 70 and the fiber connector module 80 can be up to approximately 30 microns in either direction, in both the x-plane and y-plane directions, and the normalized LOP still will be less than −0.5 dB.

In addition to the ability to relax the alignment tolerances between the fiber connector 80 optical transceiver modules used therewith, the particular configuration of the fiber connector module 80 allows it to be used as a common platform within an optical communication system. That is, the fiber connector module 80 can be used for coupling between the transmitter portion of an optical transceiver module and the receiving end of an optical fiber or, alternatively, between the transmission end of an optical fiber and the receiver portion of an optical transceiver module. The common platform for use with both transmitter and receiver optics allows the same connector to be used at both ends of the optical communication system, thus reducing the overall manufacturing cost of an optical communication system using the fiber connector modules 80.

Figure 7:
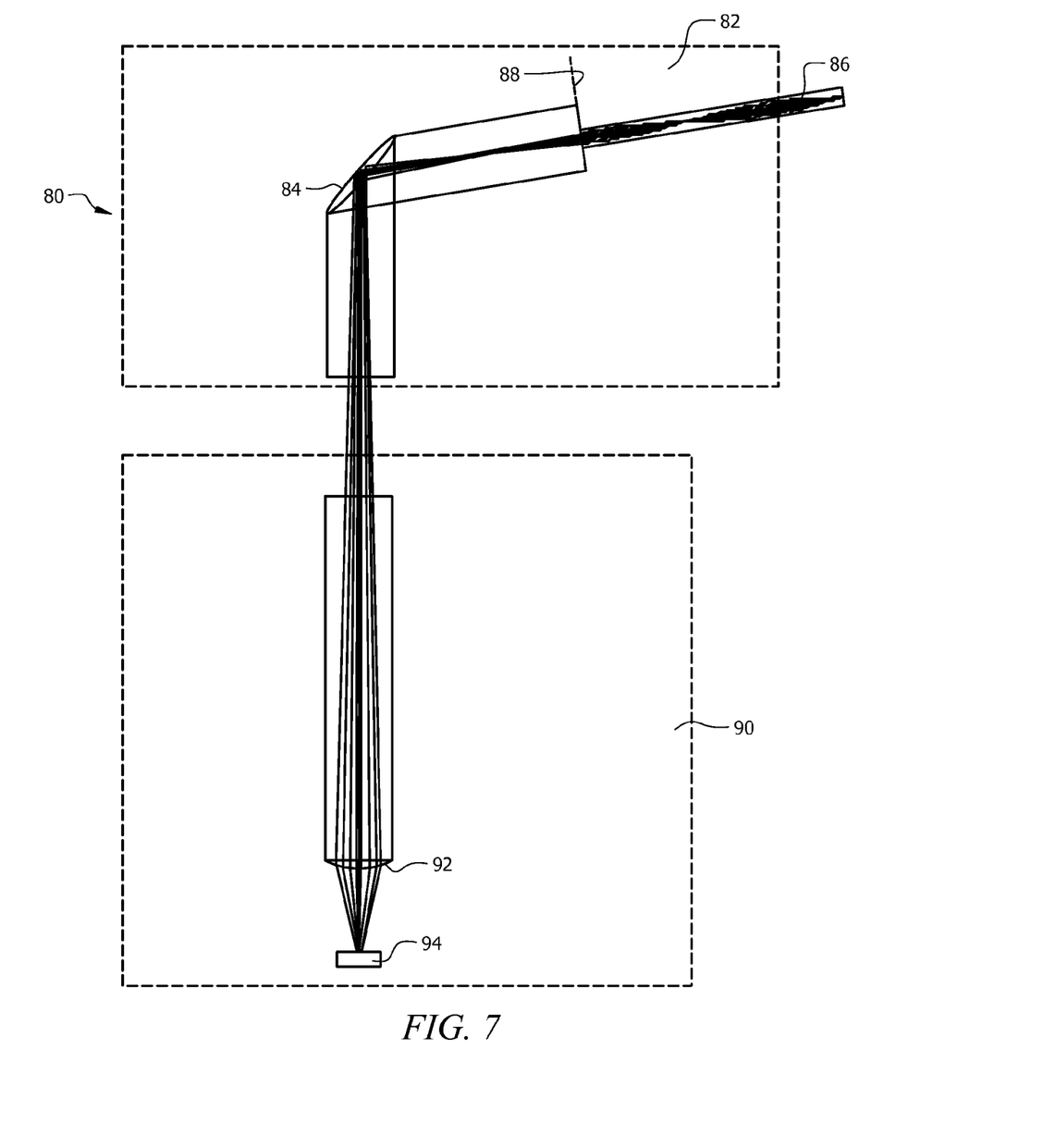
FIG. 7 illustrates a schematic view of a fiber connector module according to embodiments of the invention for use in coupling optical signals between an optical fiber and the receiver portion of an optical transceiver module.

For example, referring now to FIG. 7, shown is a schematic view of the fiber connector module 80 used in coupling optical signals between an optical fiber 86 and the receiver portion of an optical transceiver 90 according to embodiments of the invention. In this arrangement, the optical fiber 86 positioned within the v-groove or other formation 88 in the fiber connector module 80 is transmitting, rather than receiving, optical information. The optical information transmitted from the optical fiber 86 is directed by the fiber lens 84 to the optical transceiver 90 as collimated light. The optical transceiver 90 includes a focusing lens 92 for receiving the collimated light output from the fiber connector module 80. The focusing lens 92 focuses the collimated light to a point on the focal plane of the focusing lens 92. A light detector 94, such as a photodiode or any of other suitable detectors, is positioned to coincide with the focal plane of the focusing lens 94 and to be axially aligned with the optical axis of the focusing lens 92.

Figure 8:
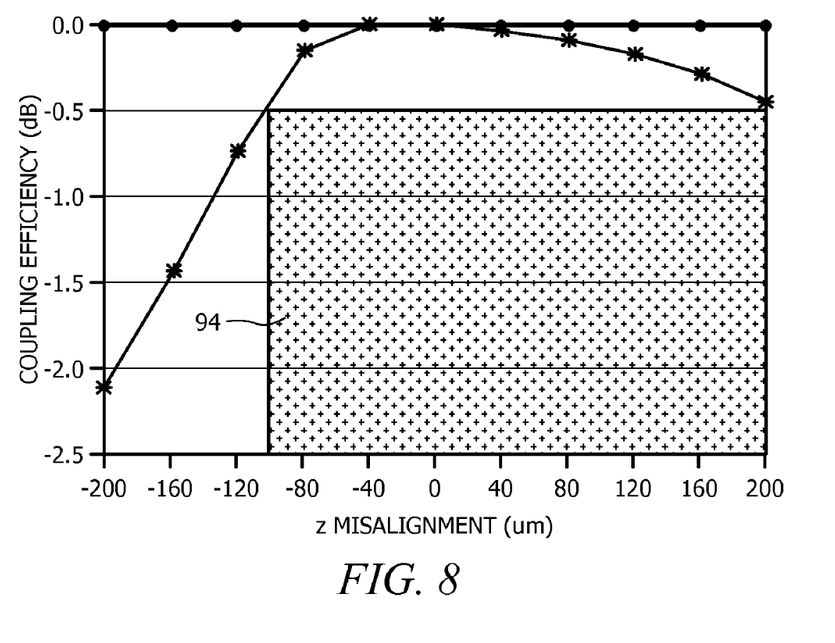
FIG. 8 illustrates a graphical view of optical coupling efficiency as a function of the axial misalignment between the fiber lens of a fiber connector module according to embodiments of the invention and the transmission end of an optical fiber positioned within the fiber connector module used in coupling optical signals between an optical fiber and an optical transceiver according to embodiments of the invention.

Referring now to FIG. 8, illustrated is a graphical view of optical coupling efficiency as a function of the axial (z direction) misalignment between the fiber lens 84 and the transmission end of an optical fiber 86 positioned within the fiber connector module 80 used in coupling optical signals between the optical fiber 86 and the receiver portion of the optical transceiver 90. Using an acceptable level of optical coupling loss of no more than −0.5 dB, the graph shows an area 94 of acceptable axial (z direction) misalignment between the transmission end of the optical fiber 86 and the fiber lens 84. As shown, acceptable optical coupling efficiency is maintained up to approximately 100 microns in one axial direction and approximately 200 microns in the other axial direction. That is, the transmission end of the optical fiber 86 can be axially misaligned up to approximately 100 microns closer to or inside of the focal plane of the fiber lens 84, or up to approximately 200 microns beyond or outside of the focal plane of the fiber lens 84, without suffering from an unacceptable level of optical coupling efficiency between the optical fiber 86 and the fiber lens 84.

Figure 9:
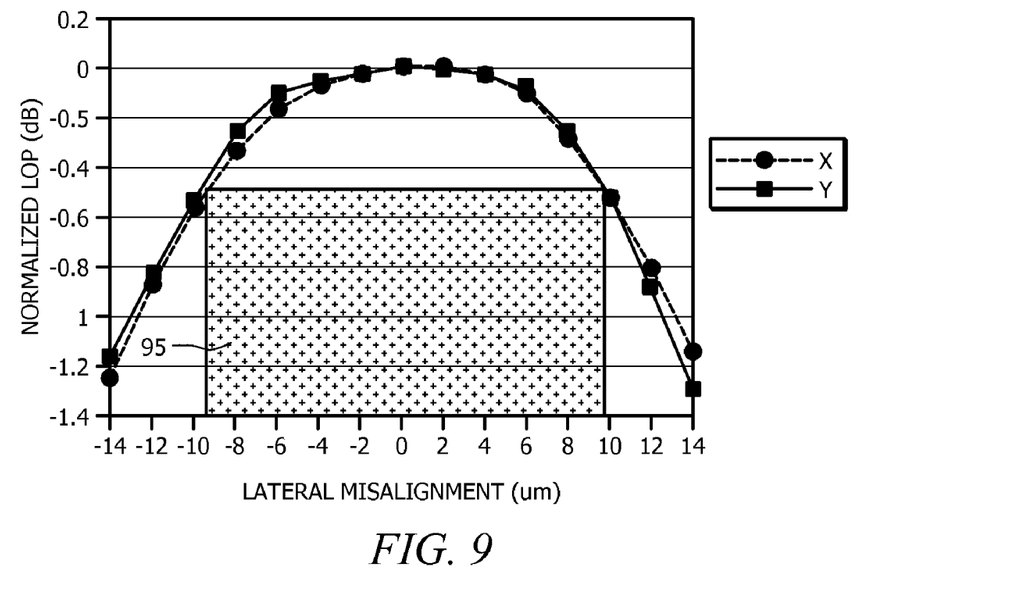
FIG. 9 illustrates a graphical view of normalized loss of power (LOP) as a function of the lateral or radial misalignment between the fiber lens of a fiber connector module according to embodiments of the invention and the transmission end of an optical fiber positioned within the fiber connector module used in coupling optical signals between an optical fiber and an optical transceiver according to embodiments of the invention.

Referring now to FIG. 9, illustrated is a graphical view of normalized loss of power (LOP) as a function of the lateral or radial misalignment between the fiber lens 84 and the transmission end of an optical fiber 86 positioned within the fiber connector module 80 used in coupling optical signals between the optical fiber 86 and the receiver portion of the optical transceiver 90. Again, using an acceptable level of normalized LOP of −0.5 dB, the graph shows an area 95 of acceptable lateral or radial misalignment between the transmission end of the optical fiber 86 and the fiber lens 84, in both the x-plane and y-plane directions. As shown, acceptable normalized LOP is maintained for up to approximately 9-10 microns of misalignment, in either lateral direction, and in both the x-plane and y-plane directions.

However, even though there is an acceptable range of axial (z direction) and lateral (radial) misalignment between the transmission end of the optical fiber 86 and the fiber lens 84, the configuration of the fiber connector module 80 is such that these misalignment tolerances are met.

According to embodiments of the invention, the fiber connector module can have any one of several suitable configurations, as will be discussed in greater detail hereinbelow. As discussed hereinabove, fiber connector modules according to embodiments of the invention allow for relatively lower profiles compared to conventional arrangements and configuration, especially in the case of parallel lane configurations. Also, fiber connector modules according to embodiments of the invention allow for the use of overmold technology, because no air gap is required between the transceiver and the fiber lens within the fiber connector module.

According to embodiments of the invention, the fiber connector module can be made by injection molding of plastics, replication optics technology or molded glass technology, with or without metallization. However, when the refractive index of the fiber connector module is relatively low, or when air is at least a portion of the transmission media for the optical path, a metallization layer or dielectric coating usually is needed. Typically, the fiber connector module is made of a material or combination of materials whose index of refraction is relatively high, thus allowing for the fiber connector module to makes use of total internal reflection.

Figure 10:
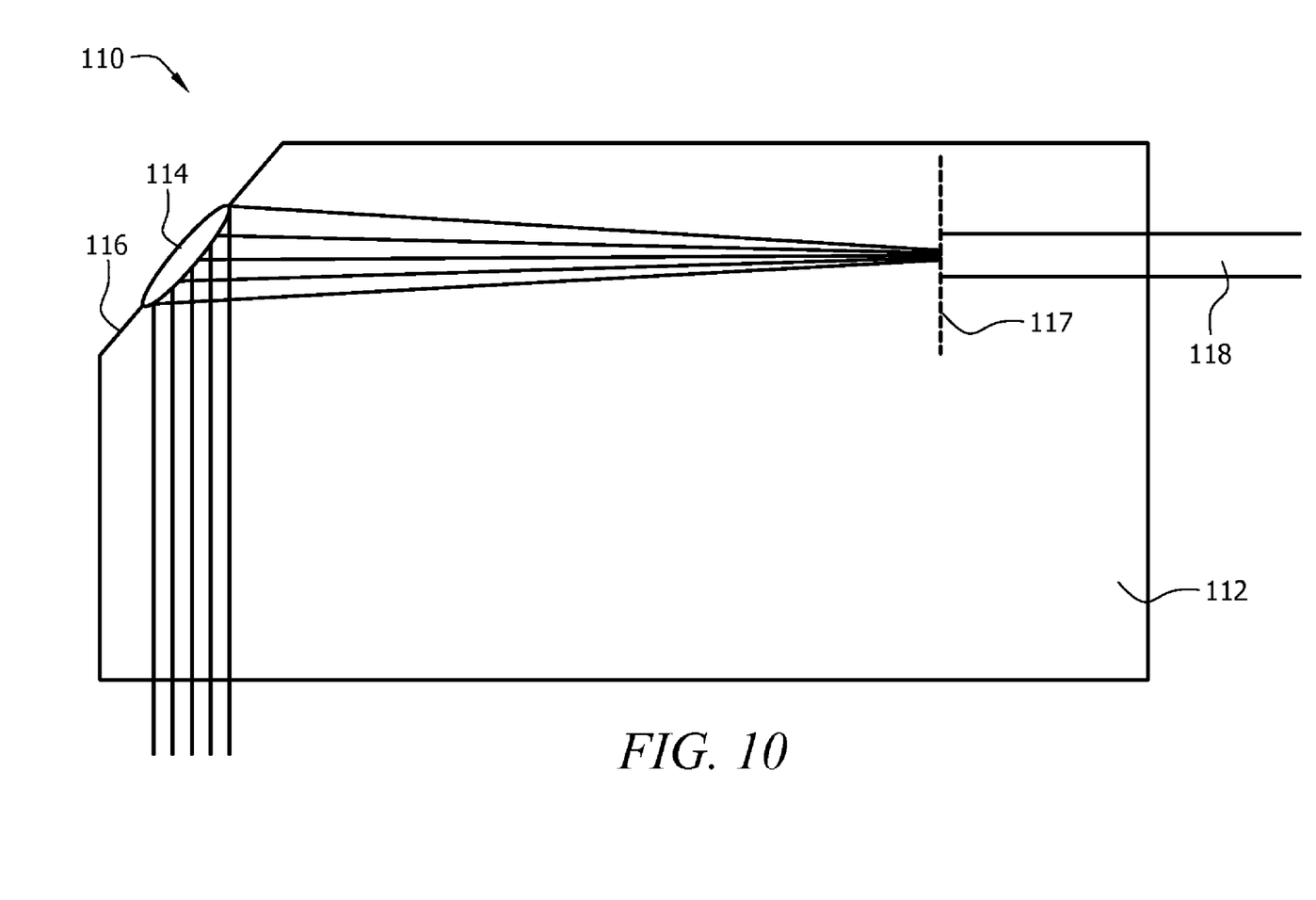
FIG. 10 illustrates a schematic view of a fiber connector module according to an embodiment of the invention for use in coupling optical signals between the transmitter portion of an optical transceiver module and an optical fiber.

Referring now to FIG. 10, shown is a schematic view of a fiber connector module 110 according to an embodiment of the invention for use in coupling optical signals between the transmitter portion of an optical transceiver module and an optical fiber. The fiber connector module 110 is configured as a single piece module, e.g., by an injection molding process. The fiber connector module 110 couples directly to a transceiver module, e.g., in the manner discussed hereinabove. For example, the fiber connector module 110 is coupled to the transceiver module (or substrate that houses the transceiver module and/or other active components) using appropriate alignment registration features formed on or in both the fiber connector module 110 and the transceiver module.

The fiber connector module 110 includes a housing 112 and a fiber lens 114. The housing 112 is configured in an appropriate shape to include an angled surface 116 that is suitably dimensioned and configured to allow the fiber lens 114 to redirect collimated light received by the fiber connector module 110 from a collimated light source (not shown) to a focal plane 117 that coincides with the receiving end of an optical fiber 118 positioned within an appropriate formation in the housing 112. Alternatively, if the receiving end of the optical fiber 118 is not to be positioned within the housing 112 of the fiber connector module 110, the fiber lens 114 can be designed and configured in a suitable manner to direct focused light to a focal plane that lies outside of the housing 112 of the fiber connector module 110. Accordingly, for proper optical coupling in such arrangement, the receiving end of the optical fiber 118 would need to coincide with that external focal plane within acceptable tolerances.

Although the fiber lens 114 in FIG. 10 is shown and described hereinabove as redirecting collimated light, e.g., from a collimated light source, it should be understood that the fiber lens 114 can be configured and/or arranged to redirect divergent light, e.g., directly from a light source. Also, although the fiber lens 114 is shown directing the focused light at an angle of approximately 90 degrees, it should be understood from the discussion hereinabove that the fiber lens 114 and the fiber connector module 120 can be manufactured, configured and/or arranged to have a tilted fiber coupling arrangement, e.g., as discussed hereinabove and shown generally in FIG. 3. Also, it should be understood that the fiber connector module 110 is suitably configured for coupling light to the receiver side of an optical transceiver module, e.g., from a transmission optical fiber.

Figure 11:
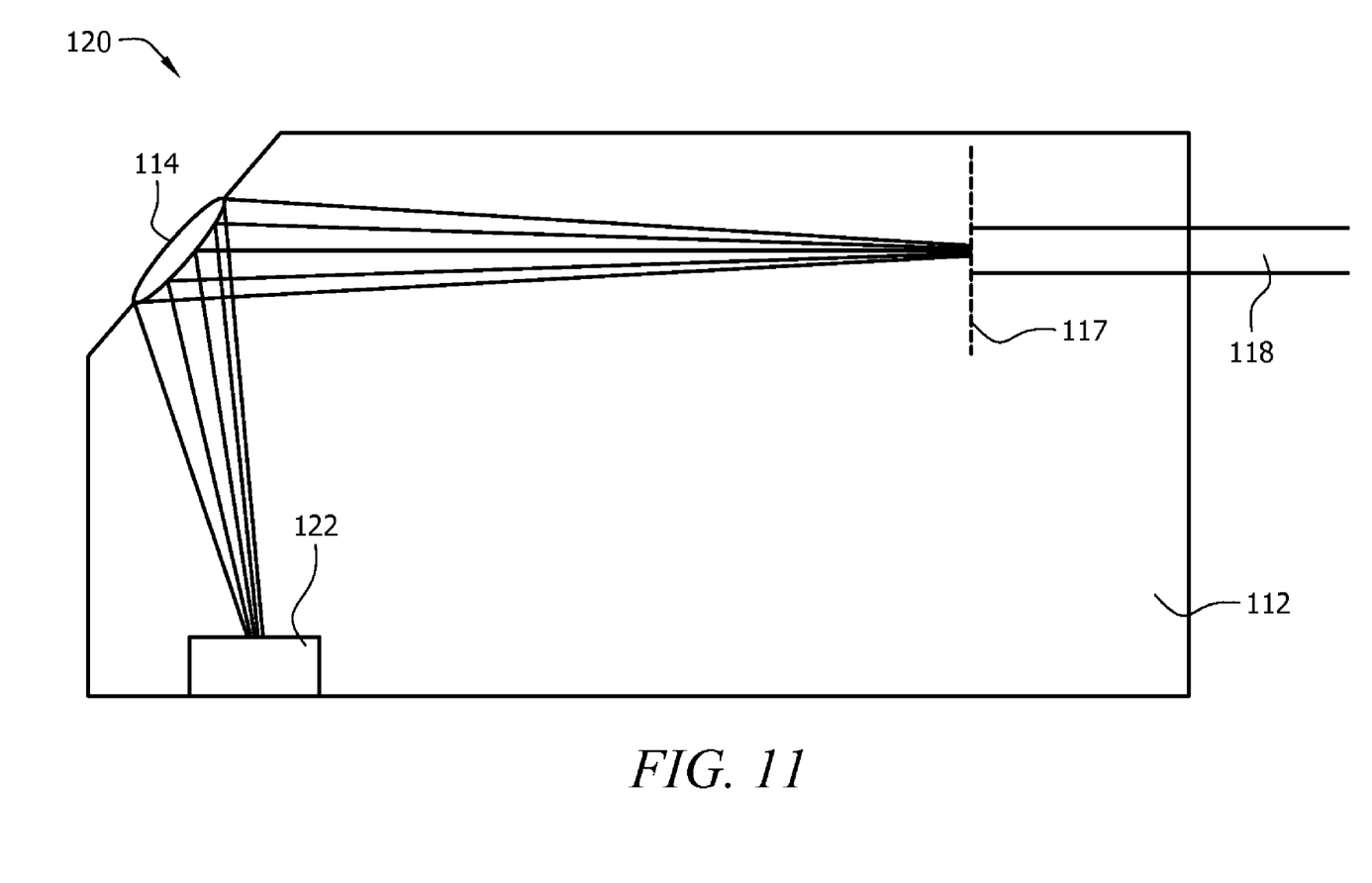
FIG. 11 illustrates a schematic view of a fiber connector module according to another embodiment of the invention for use in coupling optical signals between the transmitter portion of an optical transceiver module and an optical fiber.

According to an alternative embodiment of the invention, rather than being configured as a separate fiber connector module that is coupled to the transceiver module, the fiber connector module 110 can be molded directly onto or over all or a portion of the transceiver module (or substrate that houses the transceiver module and/or other active components), e.g., using an appropriate molding process, such as injection molding or transfer molding. Referring now to FIG. 11, shown is a schematic view of the fiber connector module 110 according to this alternative embodiment of the invention. As shown, the housing 112 of the fiber connector module 120 is molded directly onto a transceiver module 122. Also, it should be understood that the housing 112 of the fiber connector module 120 can be molded directly onto other components in addition to the transceiver module 122, including other active elements that may reside outside of the transceiver module, e.g., optical detectors on the receiver side of the transceiver module.

In FIG. 11, the transceiver module 122 is shown generally as a source of divergent light, and the fiber lens 114 is shown redirecting such divergent light from the transceiver module 122 as focused light to the receiving end of the optical fiber 118. However, it should be understood that the transceiver module 122 can be configured to generated collimated light, e.g., using appropriate collimating optics. In such case, the fiber lens 114 is configured and/or arranged appropriately to redirect collimated light from the transceiver module 122 as focused light to the receiving end of the optical fiber 118. Also, although the fiber lens 114 is shown directing the focused light at an angle of approximately 90 degrees, it should be understood from the discussion hereinabove that the fiber lens 114 and the fiber connector module 120 can be manufactured, configured and/or arranged to have a tilted fiber coupling arrangement, e.g., as discussed hereinabove and shown generally in FIG. 3. Also, it should be understood that the fiber connector module 120 is suitably configured for coupling light to the receiver side of an optical transceiver module, e.g., from a transmission optical fiber.

Figure 12:
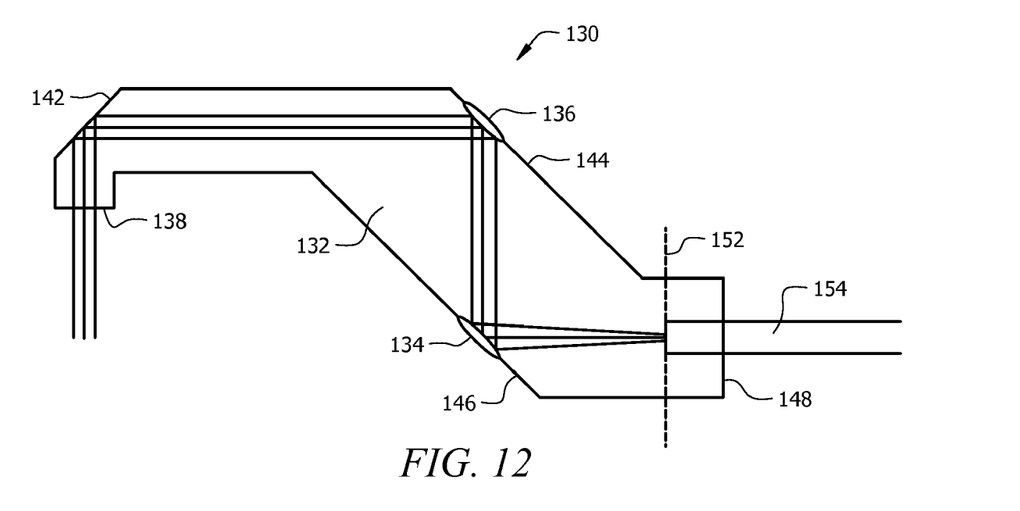
FIG. 12 illustrates a schematic view of a fiber connector module according to yet another embodiment of the invention for use in coupling optical signals between the transmitter portion of an optical transceiver module and an optical fiber.

Referring now to FIG. 12, shown is a schematic view of a fiber connector module 130 according to yet another embodiment of the invention for use in coupling optical signals between the transmitter portion of an optical transceiver module and an optical fiber. The fiber connector module 130 according to embodiments of the invention is particularly well suited to provide for relatively long distance relay of optical signals using a fiber connector module that has a relatively low profile.

The fiber connector module 130 includes a housing 132, a first fiber lens 134 and a second biconic lens 136. The housing 132 is configured in an appropriate shape and configured to include a first (input) end surface 138, a first angled TIR surface 142, a second angled surface 144, a third angled surface 146 and a second (output) end surface 148. The first angled surface 142 is shaped and configured to redirect collimated light received by the fiber connector module 130 via the first end surface 142 from a collimated light source (not shown) to the second angled surface 144.

The second angled surface 144 is shaped and configured to allow the biconic lens 136 to redirect the collimated light from the first TIR surface 142 to the first fiber lens 134. The second biconic lens 136, which has two different radii on its surface (i.e., a first radius of curvature in the x direction and a second radius of curvature in the y direction), can be coupled to the second angled surface or formed in the second angled surface 144 as part of the second angled surface 144. The second biconic lens 136 is designed and configured in a suitable manner to redirect light to the first fiber lens 134.

The third angled surface 146 is suitably dimensioned and configured to allow the fiber lens 134 to focus light from the biconic lens 136 to a focal plane 152 that coincides with the receiving end of an optical fiber 154 positioned within an appropriate formation in the second end surface 148 of the housing 132 of the fiber connector module 130. Alternatively, if the receiving end of the optical fiber 154 is not to be positioned within the second end 148 of the housing 132 of the fiber connector module 130, the fiber lens 134 can be designed and configured in a suitable manner to direct focused light to a focal plane that lies outside of the housing 132 of the fiber connector module 130. Accordingly, for proper optical coupling in such arrangement, the receiving end of the optical fiber 154 would need to coincide with that external focal plane within acceptable tolerances. For example, the fiber lens 134 could be coupled to or formed in the second end 148 of the housing 132 of the fiber connector module 130.

Although the angled surfaces and the biconic lens in the fiber connector module 130 are shown directing or redirecting light at an angle of approximately 90 degrees, it should be understood from the discussion hereinabove that the biconic lens 136 and the angled surfaces can be manufactured, configured and/or arranged to direct or redirect light at any appropriate angle, depending on the particular configuration of the housing 132 of the fiber connector module 130. Also, it should be understood that the fiber connector module 130 is suitably configured for coupling light to the receiver side of an optical transceiver module, e.g., from a transmission optical fiber.

Figure 13:
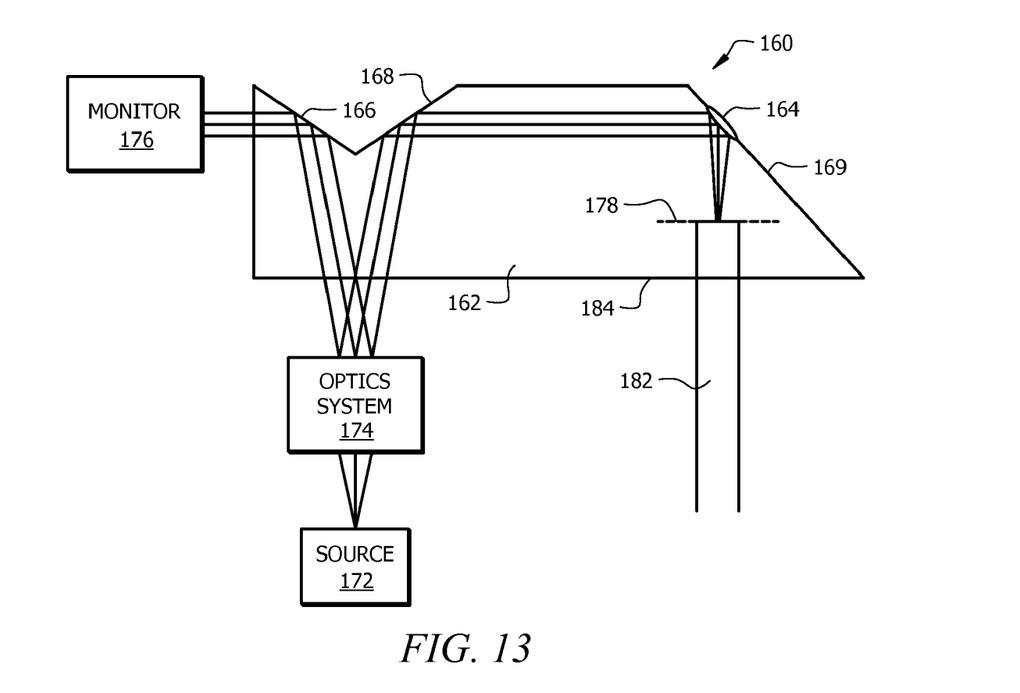
FIG. 13 illustrates a schematic view of a fiber connector module according to still another embodiment of the invention for use in coupling optical signals between a light source and an optical fiber.

Referring now to FIG. 13, shown is a schematic view of a fiber connector module 160 according to still another embodiment of the invention for use in coupling optical signals between a light source, e.g., in the transmitter portion of an optical transceiver module, and an optical detector, e.g., in the receiver portion of an optical transceiver module. The fiber connector module 160 includes a housing 162 and a fiber lens 164. The housing 162 is configured in an appropriate shape and configured to include a first angled TIR surface 166, a second angled TIR surface 168 and a third angled surface 169.

The fiber connector module 160 is particularly suitable for use with a light source 172 and as associated optics system 174 that collimates light and splits the collimated light from the light source into two separate paths of collimated light. The first angled surface 166 and the second angled surface 168 are shaped and configured in such a way that, when the light source 172 and the optics system 174 are properly aligned and optically coupled with the fiber connector module 160, the first angled surface 166 directs one path of collimated light to an optical monitoring device 176 and the second angled surface 168 directs the other path of collimated light to the fiber lens 164.

The third angled surface 169 is suitably dimensioned and configured to allow the fiber lens 164 to focus light from the second angled surface 168 to a focal plane 178 that coincides with the receiving end of an optical fiber 182 positioned within an appropriate formation in the housing 162. Alternatively, if the receiving end of the optical fiber 182 is not to be positioned within the housing 162 of the fiber connector module 160, the fiber lens 164 can be designed and configured in a suitable manner to direct focused light to a focal plane that lies outside of the housing 162 of the fiber connector module 160. Accordingly, for proper optical coupling in such arrangement, the receiving end of the optical fiber 182 would need to coincide with that external focal plane within acceptable tolerances. For example, the fiber lens 164 could be coupled to or formed in a suitable portion of a bottom surface 184 of the housing 162 of the fiber connector module 160.

Although the fiber lens 164 in FIG. 13 is shown and described hereinabove as redirecting collimated light, e.g., from a collimated light source, it should be understood that the fiber lens 164 can be configured and/or arranged to redirect divergent light, e.g., directly from a light source (via the second TIR surface 168). Also, although the fiber lens 164 is shown directing the focused light at an angle of approximately 90 degrees, it should be understood from the discussion hereinabove that the fiber lens 164 and the fiber connector module 160 can be manufactured, configured and/or arranged to have a tilted fiber coupling arrangement, e.g., as discussed hereinabove and shown generally in FIG. 3. Also, it should be understood that the fiber connector module 160 is suitably configured for coupling light to the receiver side of an optical transceiver module, e.g., from a transmission optical fiber.

The fiber connector modules including the fiber lens or lensed reflector according to embodiments of the invention allow for relatively low profile optical turn devices for use with relatively compact transceiver designs that continue to decrease in profile. As discussed hereinabove, fiber connector modules according to embodiments of the invention can be configured to make use of multi-lens optics system, e.g., for use with parallel, multi-channel optical transmission systems.

Also, the fiber connector modules according to embodiments of the invention allow for field lens or relay lens functionality within a single fiber connector module made of a single material. In this manner, the use of alternating materials in the optical path, e.g., within the fiber connector module, is avoided for long distance relay, unlike conventional lensed optical systems.

It should be noted that, although the inventive fiber connector modules described herein are intended for use with an optical transceiver module, the inventive fiber connector modules described herein are not limited to being used with an optical transceiver module having the features described herein. The optical transceiver module is merely an example of one optical transceiver module design that is suitable for use with the inventive fiber connector modules.

It will be apparent to those skilled in the art that many changes and substitutions can be made to the fiber connector module and method for coupling optical signals between an optical transceiver and an optical fiber herein described without departing from the spirit and scope of the invention as defined by the appended claims and their full scope of equivalents.

The invention claimed is:

1. A fiber connector module, comprising:
   a connector module housing configured to couple the fiber connector module to an optical transceiver, wherein the connector module housing includes a first angled total internal reflection (TIR) surface, a second angled surface and a third angled surface, and is configured to receive the receiving end of at least one optical fiber therein;
   a biconic lens that is part of the second angled surface; and
   a fiber lens that is part of the third angled surface and configured to receive collimated light and to focus the collimated light to a focal point,
   wherein the first TIR surface is configured in such a way that the first TIR surface redirects collimated light from an optical transceiver coupled to the fiber connector module to the biconic lens,
   wherein second angled surface is configured in such a way that the biconic lens redirects focused light redirected from the first TIR surface to the fiber lens, and
   wherein the third angled surface is configured in such a way that the fiber lens focuses collimated light redirected from the biconic lens to the receiving end of an optical fiber received by the connector module housing in such a way that the focal point of the focused light from the fiber lens substantially coincides with the receiving end of the optical fiber in the connector module housing, wherein the angled surface is angled at approximately 45 degrees with respect to the receiving end of the optical fiber.

2. The fiber connector module as recited in claim 1, wherein the fiber lens redirects focused light at a redirection angle, and wherein the redirection angle is based on at least one of the refractive index of the material of which the fiber lens is made, the angle of the angled surface with respect to the optical path of the collimated light, and the configuration of the fiber lens.

3. The fiber connector module as recited in claim 1, wherein the angled surface and the fiber lens are configured in such a way that the fiber lens redirects focused light at a redirection angle of approximately 90 degrees.

4. The fiber connector module as recited in claim 1, wherein fiber lens is formed as a part of the angled surface.

5. The fiber connector module as recited in claim 1, wherein the fiber lens is one of a biconic lens and an irregular lens.

6. The fiber connector module as recited in claim 1, wherein the connector module housing includes at least one angled total internal reflection (TIR) surface that is configured to redirect at least a portion of collimated light from an optical transceiver coupled to the fiber connector module to at least one optical monitoring device coupled to the fiber connector module.

7. The fiber connector module as recited in claim 1, wherein the connector module housing includes a first angled total internal reflection (TIR) surface that is configured to redirect at least a portion of collimated light from an optical transceiver coupled to the fiber connector module to at least one optical monitoring device coupled to the fiber connector module, and wherein the connector module housing includes a second angled TIR surface that is configured to redirect at least a portion of collimated light from an optical transceiver coupled to the fiber connector module to the fiber lens.

8. The fiber connector module as recited in claim 1, wherein the connector module housing is made by injection molding.

9. An optical coupling module, comprising:
   a substrate;
   a transceiver module coupled to the substrate;
   a connector module housing overmolded over the transceiver module and at least a portion of the substrate, wherein the connector module housing includes a first angled total internal reflection (TIR) surface, a second angled surface and a third angled surface, and is configured to receive the receiving end of at least one optical fiber therein;
   a biconic lens that is part of the second angled surface; and
   a fiber lens that is part of the third angled surface and configured to receive collimated light and to focus the collimated light to a focal point,
   wherein the first TIR surface is configured in such a way that the first TIR surface redirects collimated light from the optical transceiver to the biconic lens,
   wherein second angled surface is configured in such a way that the biconic lens redirects focused light redirected from the first TIR surface to the fiber lens, and
   wherein the third angled surface is configured in such a way that the fiber lens focuses collimated light redirected from the biconic lens to the receiving end of an optical fiber coupled to the connector module housing in such a way that the focal point of the focused light from the fiber lens substantially coincides with the receiving end of the optical fiber, wherein the angled surface is angled at approximately 45 degrees with respect to the receiving end of the optical fiber.

10. The optical coupling module as recited in claim 9, wherein the fiber lens redirects focused light at a redirection angle, and wherein the redirection angle is based on at least one of the refractive index of the material of which the fiber lens is made, the angle of the angled surface with respect to the optical path of the collimated light, and the configuration of the fiber lens.

11. The optical coupling module as recited in claim 9, wherein the connector module housing includes at least one angled total internal reflection (TIR) surface that is configured to redirect at least a portion of collimated light from an optical transceiver coupled to the fiber connector module to at least one optical monitoring device coupled to the fiber connector module.

12. The optical coupling module as recited in claim 9, wherein the connector module housing includes a first angled total internal reflection (TIR) surface that is configured to redirect at least a portion of collimated light from an optical transceiver coupled to the fiber connector module to at least one optical monitoring device coupled to the fiber connector module, and wherein the connector module housing includes a second angled TIR surface that is configured to redirect at least a portion of collimated light from an optical transceiver coupled to the fiber connector module to the fiber lens.

13. The optical coupling module as recited in claim 9, wherein the receiving end of the optical fiber is positioned within the connector module housing.

14. The optical coupling module as recited in claim 9, wherein the connector module housing is made by an overmolding process.

15. A method for coupling optical signals between an optical transceiver and an optical fiber, the method comprising:
   receiving collimated light from the optical transceiver by a fiber connector module having a connector module housing, wherein the connector module housing is configured to couple the fiber connector module to the optical transceiver and to receive the receiving end of at least one optical fiber therein, and wherein the connector module housing includes a first angled total internal reflection (TIR) surface, a second angled surface to which a biconic lens is a part of and a third angled surface to which a fiber lens is a part of;
   redirecting by the first TIR surface collimated light from the optical transceiver to the biconic lens;
   redirecting by the biconic lens focused light redirected from the first TIR surface to the fiber lens; and
   focusing with the fiber lens collimated light to a focal point, wherein the third angled surface is configured in such a way that the fiber lens focuses collimated light redirected from the biconic lens to the receiving end of an optical fiber received by the connector module housing in such a way that the focal point of the focused light from the fiber lens substantially coincides with the receiving end of the optical fiber in the connector module housing, wherein the angled surface is angled at approximately 45 degrees with respect to the receiving end of the optical fiber.

16. The method as recited in claim 15, wherein the fiber lens redirects focused light at a redirection angle that is based on at least one of the refractive index of the material of which the fiber lens is made, the angle of the angled surface with respect to the optical path of the collimated light, and the configuration of the fiber lens.

17. The method as recited in claim 15, wherein fiber lens is formed as a part of the angled surface.

18. The method as recited in claim 15, wherein the fiber connector module is coupled to the optical transceiver by overmolding the fiber connector module onto the optical transceiver.

\* \* \* \* \*